(No Model.)
W. G. WARING.
PROCESS OF REFINING SILVER SULPHIDES.
No. 475,907. Patented May 31, 1892.
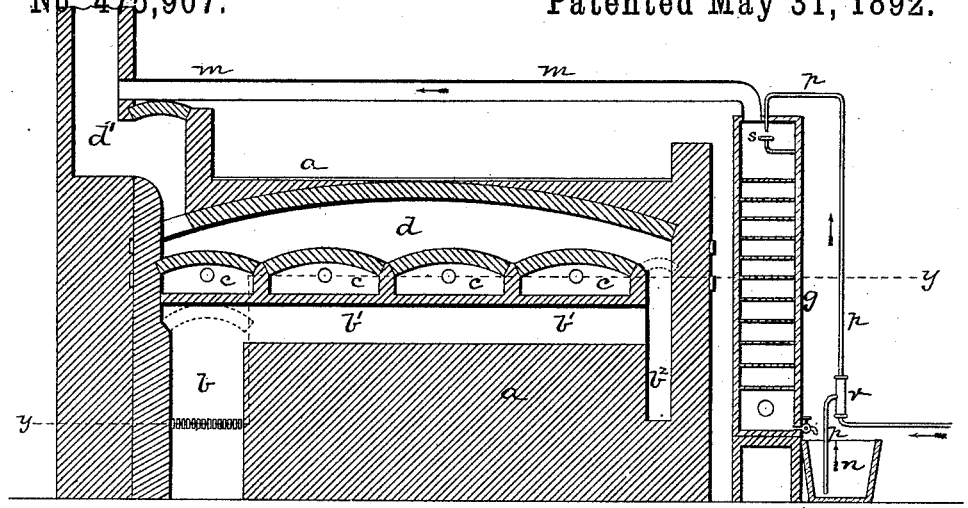
Fig. 2.
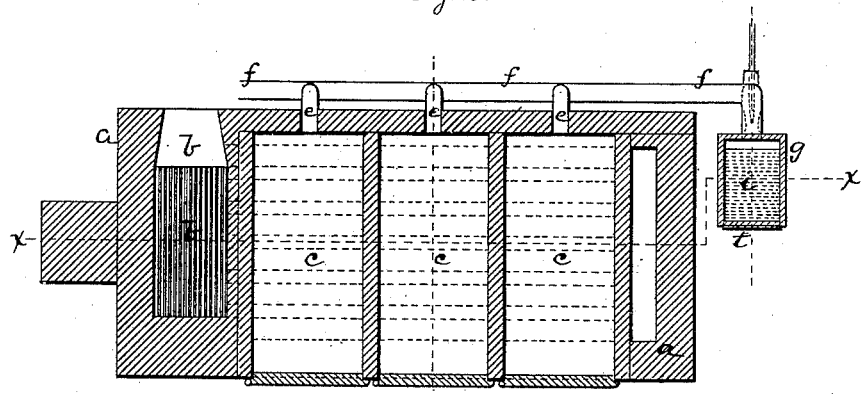
Fig. 1.
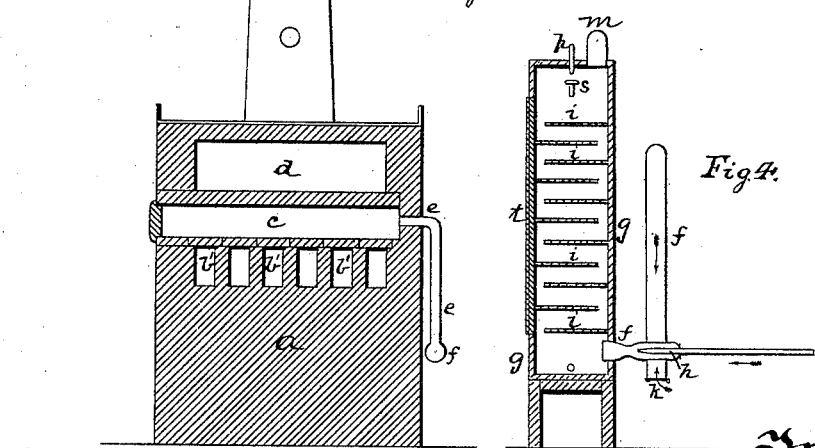
Fig. 3.
Fig. 4.
Witnesses:
Inventor,
W. George Waring
By James J. Kay
Attorneys

UNITED STATES PATENT OFFICE.

WILLIAM GEORGE WARING, OF SILVER CITY, TERRITORY OF NEW MEXICO.

PROCESS OF REFINING SILVER SULPHIDES.

SPECIFICATION forming part of Letters Patent No. 475,907, dated May 31, 1892.

Application filed October 8, 1886. Serial No. 215,680. (No model.)

*To all whom it may concern:*

Be it known that I, WILLIAM GEORGE WARING, of Silver City, in the county of Grant and Territory of New Mexico, have invented a new and useful Improvement in the Process of Refining Silver Sulphides; and I do hereby declare the following to be a full, clear, and exact description thereof.

My invention relates to the refining of impure argentiferous sulphides containing copper such as the sulphides produced by precipitating leach liquors from the lixiviation of silver ores by alkaline hyposulphites or other methods, various matters produced in the metallurgical treatment of silver ores, or any compound of silver, copper, and sulphur, whether containing other substances or not, its object being to remove the copper and other metals from the sulphides, leaving the silver in a pure or nearly pure state, and to utilize in such treatment the materials contained in the impure sulphides, so as to reduce the cost of the process.

My invention consists generally in roasting the impure argentiferous sulphides to be treated, thus decomposing the sulphides of copper, silver, or other metals contained therein and evolving sulphur dioxide, mixing this sulphur dioxide with steam and air, and forcing said gases or vapors through argentiferous material previously decomposed by roasting, thus dissolving therefrom the oxides of copper or other metals contained therein and leaving the silver in substantially a pure condition.

It also consists, in connection with the above process, in moistening the roasted material during its treatment by the combined vapor, steam, air, and sulphur dioxide with the condensed products obtained from these mixed gases during the treatment of the roasted material therewith, these condensed products assisting in the process of dissolving out the oxides of copper or other metals.

To enable others skilled in the art of metallurgy to practice my improved process, I will describe the same more fully, referring to the accompanying drawings, in which—

Figure 1 is a longitudinal section of the roasting-furnace and condensing-vessel on the line $xx$, Fig. 2. Fig. 2 is a horizontal section of the same on the line $yy$, Fig. 1. Fig. 3 is a cross-section of the roasting-furnace, and Fig. 4 is a longitudinal section of the condensing-vessel at right angles to that shown in Fig. 1.

Like letters of reference indicate like parts in each.

In practicing my improved process I employ any suitable roasting or muffle furnace for roasting the ores, the furnace $a$ (shown in the accompanying drawings) having the fireplace $b$ and a series of muffles $c$, these muffles being arranged above the fireplace, the flues $b'$ leading under them and a top flue $d$ leading over the muffle to the chimney $d'$, the ore contained in the muffles being thus subjected to the heat applied both above and below the same.

At one end of the flues $b'$ is a soot-chamber $b^2$.

The muffles $c$ are provided with suitable doors at one end, and from the opposite end pipes or flues $e$ communicate with a common pipe or flue $f$, which leads to the refining-chamber or condensing-vessel $g$, so that during the roasting of the ores the sulphur dioxide evolved from the sulphides contained within the muffles will pass through these pipes into the condensing-vessel and all the sulphur be driven off or evolved from the ores contained in the muffle, the metals of the ores remaining therein in the form of oxides. These oxides, after roasting, as above described, are crushed, so as to bring them into a finely-divided condition, and then placed within the refining-chamber or condensing-vessel $g$, this vessel being lined with sheet-lead and containing trays $i$, which are removable therefrom and are formed of perforated stoneware, the crushed oxides being placed upon these trays within the refining-chamber $g$.

The refining-chamber is provided with a suitable door, as at $t$, by means of which the trays may be filled or removed therefrom. The pipe or flue $f$, leading from the muffles to this chamber, enters at the base thereof and a suitable steam-injector $h$ enters this flue, the flue also being provided with an air-inlet controlled by a suitable register, as at $k$, so that the steam from the injector in passing into the flue $f$ draws the sulphur-dioxide gases from the muffles and forces them into the refining-chamber, at the same time drawing in air through the register $k$ and forcing these mixed gases through the crushed oxides resting on the trays within the refining-chamber. The gases then pass through the waste-gas flue $m$ into the chimney $d'$, and any condensed products or liquids obtained from the mixed gases entering the refining-chamber collects at the base of said chamber, which is provided with a suitable cock, through which these products may pass into the reservoir $n$. Communicating with this reservoir is a pipe $p$, which leads up to the top of the refining-chamber, entering centrally through the top thereof, this pipe having a steam-siphon $r$ therein, by means of which these condensed products are pumped from the reservoir $n$ back into the refining-chamber, and so descend through the metallic oxides supported on the trays therein, acting to moisten the said metallic oxides and assist in the refining of the same, these condensed products in percolating through the metallic oxides acting in substantially the same manner upon them as the mixed gas in rising through them. At the upper end of the refining-chamber is the disk or spreading-plate $s$, directly under the discharge-opening of the pipe $p$, by means of which the condensed products pumped from the reservoir $n$ are spread within the refining-chamber, so as to be distributed over the entire surface of the materials supported on the trays.

In practicing my improved process with the apparatus above described a quantity of impure silver-bearing material to be refined corresponding to the charge of the refining-chamber is placed within the muffles and is roasted in the ordinary manner until all sulphides of copper, silver, or other metals have been completely decomposed and the metals exist as oxides or reguline metal in the roasted mass. These metallic oxides so obtained are then crushed to the fineness of from ten to twenty mesh, or any other size that is found most suitable to the particular material to be treated, and they are placed on the trays in the refining-chamber. Another like charge of unroasted material is then placed in the furnace muffle or muffles and heat applied in the same manner to decompose the ores and evolve the sulphur dioxide, the heat applied being sufficient to burn off the sulphur dioxide without fusing the material, and through the steam-injector $h$ the sulphur-dioxide gases, together with steam and air, are forced into the condensing-vessel, this mixture of muffle-gases, steam, and air passing upwardly through the metallic oxides supported on the trays and the gases passing through the waste-gas flue $m$ to the chimney.

In commencing the process the oxides to be treated may be moistened with water, and as the process is continued the muffle-gases, steam, and air will be condensed and will collect in the bottom of the refining-chamber, and as the process is continued these condensed products from the mixed gases are pumped through the pipe $p$ to the top of the refining-chamber and employed to moisten the oxides contained therein. The proportions of the current of steam, air, and muffle-gases are so regulated that the mixture shall contain at least sufficient free oxygen to form with the sulphur dioxide evolved from the material being roasted in the muffle or muffles sulphuric anhydride when the mixture of gases comes in contact with the oxide of copper present in the charge and forming some sulphuric acid, which with the sulphuric anhydride dissolves the copper and carries it away with the percolating liquid without affecting the silver to any material extent. The same results are obtained with iron, zinc, nickel, manganese, and like metals or their oxides present within the roasted materials to be treated, and at the end of the process only nearly pure silver and possibly sulphate of lead is left within the refining-chamber, these materials remaining in form easily melted into pure silver. As the condensed products percolate through the materials to be treated the sulphuric acid and sulphates contained therein assist materially in dissolving out the copper or other base metals contained within the refining-chamber. The material in the muffles is removed as fast as it becomes properly roasted, and the operation is continued until all the copper or base metals in the roasted material in the refining-chamber are dissolved. The material so treated is then taken out and washed and smelted in the cupelling-hearth, if lead is present, or in black-lead crucibles, with the addition of suitable fluxes, and poured out into bars. The condensing-vessel is recharged with the roasting material from the previous roasting and the process continued as before. If it occurs that any silver is dissolved with the copper in the condensing-vessel, all that is necessary to recover it in a metallic state from the liquor is to immerse metallic copper in the liquor by which the silver is precipitated in a finely-divided metallic form. The copper can be recovered from the liquor by precipitation with metallic iron, or by any of the usual methods for recovering copper from waste liquors. By my invention I am enabled to purify these argentiferous sulphides without the use of any chemicals, except such as are produced from the material operated upon, as well as to extract the silver in a pure state without loss from volatilization, and I am thus enabled to obtain the silver at a much lower cost than by any of the processes heretofore employed.

What I claim as my invention, and desire to secure by Letters Patent, is—

1. The herein-described process of separating the base metals from the silver contained in impure artificial argentiferous sulphides, which consists in roasting the said sulphides, mixing the sulphur dioxide evolved therefrom with steam and air, and forcing the said mixed gases through previously-roasted impure artificial argentiferous sulphides, substantially as described.

2. The herein-described process of separating the base metals from the silver contained in impure artificial argentiferous sulphides, consisting in roasting the said sulphides, mixing the sulphur dioxides evolved therefrom with steam and air, forcing said mixed gases or vapors through like previously-roasted material, and leaching said material with the condensed products obtained during the treatment, substantially as and for the purposes set forth.

3. The herein-described process of separating the base metals from the silver contained in impure artificial argentiferous sulphides, which consists in roasting the said sulphides, crushing the same, and forcing through the roasted and crushed sulphides the mixed gases formed of steam and air and the sulphur dioxide evolved from roasting like sulphides, substantially as described.

In testimony whereof I, the said W. GEORGE WARING, have hereunto set my hand.

W. GEORGE WARING.

Witnesses:
H. W. BISHOP,
I. H. FLAGLER.